Jan. 15, 1935.  R. H. KAUFMANN  1,988,278
ELECTRICAL LOAD CONTROL SYSTEM
Filed March 15, 1934   3 Sheets-Sheet 1

Inventor:
Richard H. Kaufmann,
by Harry E. Dunham
His Attorney

Jan. 15, 1935.  R. H. KAUFMANN  1,988,278
ELECTRICAL LOAD CONTROL SYSTEM
Filed March 15, 1934   3 Sheets-Sheet 3

Fig. 5.

Inventor:
Richard H. Kaufmann,
by Harry E. Dunham
His Attorney.

Patented Jan. 15, 1935

1,988,278

UNITED STATES PATENT OFFICE 1,988,278

ELECTRICAL LOAD CONTROL SYSTEM

Richard H. Kaufmann, Schenectady, N. Y., assignor to General Electric Company, a corporation of New York Application March 15, 1934, Serial No. 715,606

11 Claims. (Cl. 171—97)

My invention relates to electrical load control systems and more particularly to automatic electric power demand limiting systems.

It is customary for commercial purchasers of electric power to pay a charge, known as a demand charge, which is proportional to their maximum demand. Maximum demand may be defined as the maximum integrated amount of electrical energy, usually measured in kilowatt hours, which is used during any one of successive equal time intervals, whose individual durations are known as the demand period. As a result of this way of charging for electrical energy it is to the advantage of consumers to provide automatic means for preventing the establishment of higher than necessary maximum demands.

In accordance with my invention I provide a novel automatic maximum demand limiting system. Broadly speaking, my system operates during the early part of the demand period to reduce the effective load value of the consumer substantially in proportion to the average rate of increase of the integrated energy he consumes. The theory of this is that the more rapidly the integrated energy required by the load builds up during the first part of the demand period, the more the previously established maximum demand is likely to be exceeded and consequently the greater the effective reduction of load necessary to prevent this occurrence.

The way I at present contemplate securing the above operation is through the use of time controlled circuit controllers which operate successively to incapacitate the circuits for removing load increments, so that depending upon the time required for a predetermined fraction of the maximum demand to be attained, the number of removed load increments, or the amount of load reduced, will vary inversely with this time.

I wish to point out, however, that my invention is entirely independent of the particular way in which the effective load on a power circuit is reduced. Thus, there are two well known main ways of controlling or reducing the effective value of load on a power circuit, one way being to control the load itself and the other way being to control an auxiliary source of current supply for assuming a part of the load. Both ways produce the same net result on the main power circuit in that the effective load value is reduced. Furthermore, there are a great many equivalent ways of reducing the value of the load itself. Thus, in the case of loads like electrode furnaces, load may be controlled in infinitely small increments by electrode control, whereas in the case of loads comprising a plurality of parallel connected load devices, such as electric motors, load may be controlled by disconnecting one or more of the motors entirely from the circuit, so that in this case the load is controlled in positive increments of appreciable value.

An object of my invention is to provide a new and improved electrical load control system.

A further object of my invention is to provide a new and improved automatic maximum power demand limiting system.

My invention will be better understood from the following description taken in connection with the accompanying drawings and its scope will be pointed out in the appended claims.

Figure 1:
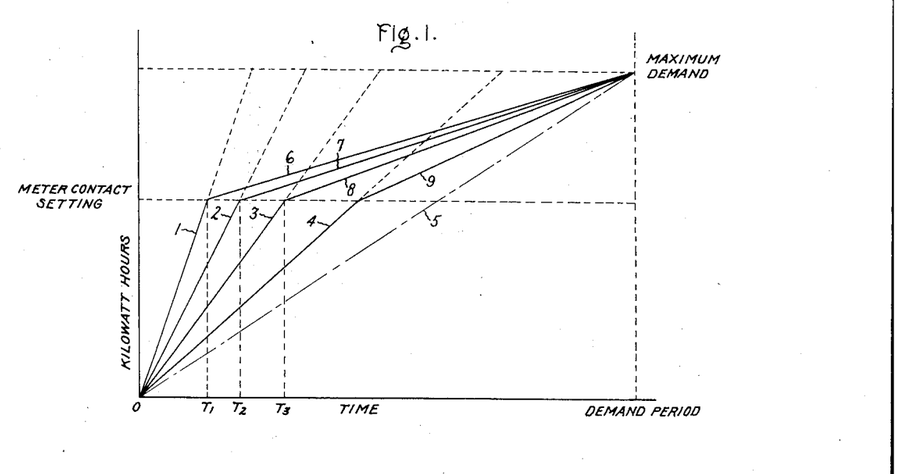
Fig. 1 is a chart for illustrating the principles of operation of my invention.

Turning now to Fig. 1 of the accompanying drawings, I have shown therein, plotted against time as abscissae and kilowatt hours as ordinates, four load lines 1, 2, 3 and 4, respectively. It will be seen that all four of these lines represent a rate of energy consumption which is greater than an ideal rate of energy consumption, indicated by a dot and dash line 5, which line just reaches the maximum demand at the end of the demand period. This fact is brought out in another way by the dashed extension of the lines 1, 2, 3 and 4, all of which intersects the uppermost horizontal dashed line, or maximum demand line, before the end of the demand period, thereby indicating that the maximum demand will be exceeded at the end of the demand period if energy continues to be used at any of the rates indicated by these four lines. It will also be seen that the load lines 1, 2, 3 and 4 are all modified at a particular intermediate value of integrated energy into new load lines 6, 7, 8 and 9, respectively. Furthermore, it will be seen that lines 6, 7, 8 and 9 are successively steeper, whereas lines 1, 2, 3 and 4 are successively flatter, and that lines 6, 7, 8 and 9 all finish at a value of kilowatt hours corresponding to the demand period.

Lines 1, 2, 3, 4, 6, 7, 8 and 9 illustrate graphically the essential principle of my invention, for it can be seen from these lines that, during the early part of the demand period, if the rate of energy increase is so high that if continued at that rate it will exceed the maximum demand, then at some intermediate value of demand the effective load value is reduced substantially in proportion to the rate of increase of energy use, so that for the remaining portion of the demand period the integrated energy will increase at a rate which will not cause an exceeding of the maximum demand at the end of the demand period. The particular intermediate value of kilowatt hours or energy at which load reduction takes place, may be set arbitrarily and may be determined from studies of the load characteristics of the power circuit. One way of initiating my load limiting action at this particular value of energy is by actuating a circuit controller when this particular value of energy is attained. For example, a contact making power demand meter may have its contacts set so that when the kilowatt hours used by the circuit reaches this particular intermediate value, the contacts will be closed.

As previously stated, one way of obtaining the operation which is charted in Fig. 1 is by the use of time controlled circuit controllers operating in conjunction with an energy actuated circuit controller. Thus, for example, if the energy actuated circuit controller is actuated any time between the beginning of the demand period and time $T_1$ (Fig. 1), the load will be reduced by such an amount that the resulting load curve is similar to curve 6, whereas if the energy actuated circuit controller is actuated between times $T_1$ and $T_2$ not as much load is removed and the resultant load curve is shown by line 7, whereas if the energy actuated circuit controller requires still longer for its actuation and it is actuated any time between times $T_2$ and $T_3$ then the load which is removed is still less and the resultant load curve is that shown in line 8.

The difference in slope between lines 4 and 9 may be represented by the removal of a load increment which is not under time control, so that whenever the energy actuated circuit controller is actuated upon the occurrence of a predetermined fraction of the maximum demand, this load increment is removed. This feature is optional and may or may not be used in connection with the time controlled load increments.

It should, of course, be understood that Fig. 1 is merely for the purpose of illustrating the principles of operation of my invention and it represents ideal operation of the system in which the maximum demand is exactly attained at exactly the end of each demand period. In actual practice, the load curves are never straight lines such as are indicated in Fig. 1, and the load value is usually fluctuating in character. Consequently, the amount of load which is removed between times $T_1$, $T_2$, $T_3$, etc., must be determined from a study of the load curves of the system and judgment must be used in selecting the load increments to be removed so that in no case, or possibly only in very extreme and exceptional cases, will the maximum demand be exceeded.

Figure 2:
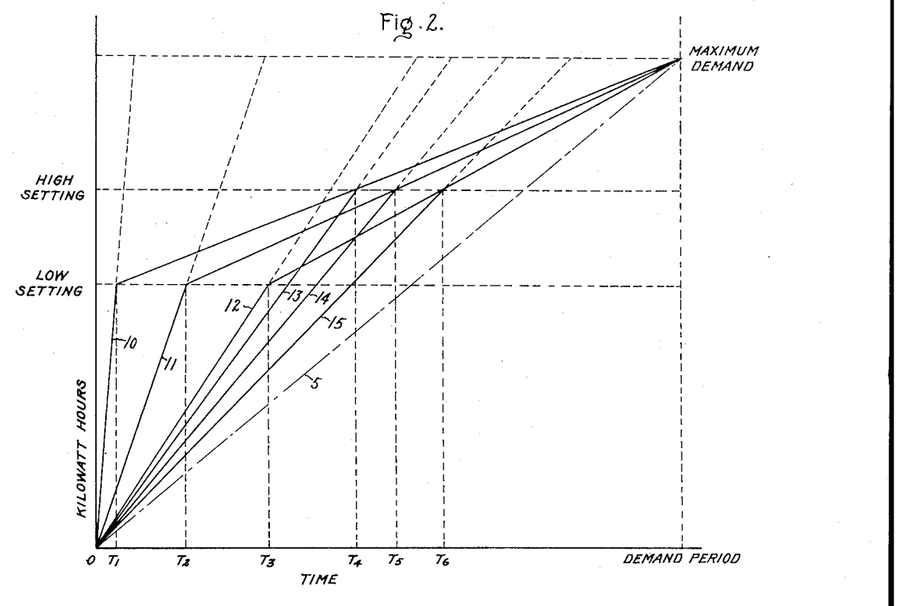
Fig. 2 is a chart for illustrating the principles of operation of a modified form of my invention.

Fig. 2 illustrates graphically how the principle of Fig. 1 may be extended so as to secure control and load reduction at more than one intermediate value of energy consumption during the demand period. Thus, in this figure, the two intermediate horizontal dotted lines represent a low setting and a high setting of a contact making energy responsive controller, such as a contact making maximum demand meter. The arrangement is such that up to time $T_3$ progressively less load is removed, provided the load curves have slopes of the order of curves 10, 11 and 12, whereas at later times $T_4$, $T_5$ and $T_6$, respectively, progressively less load is removed provided the energy curves are of the order of curves 13, 14 and 15, respectively, and the arrangement is such that load is not removed in this latter case until a higher value of energy use has been obtained, which value corresponds to the high setting of the contact making device. In this manner, a double check is provided, for if the energy consumption which has been reduced at the low setting is still too high when the high setting is reached, further reduction of load is made. At the same time, the arrangement of Fig. 2 has the advantage of being able to reduce load earlier in the demand period and this is desirable in cases where the energy consumption starts out at a high rate. In Fig. 2 only three load increments are controlled at times $T_1$, $T_2$ and $T_3$, respectively, and only three load increments are controlled at times $T_4$, $T_5$ and $T_6$, respectively, and these latter increments may be the same as the increments controlled at times $T_1$, $T_2$ and $T_3$, if desired. Furthermore, in Fig. 2 the additional, or fourth, load increment present in Fig. 1 has been dispensed with and only time controlled load increments are provided. However, additional load increments which operate whenever the high setting or the low setting is attained, may be added if desired in the same manner as is indicated in Fig. 1.

Figure 3:
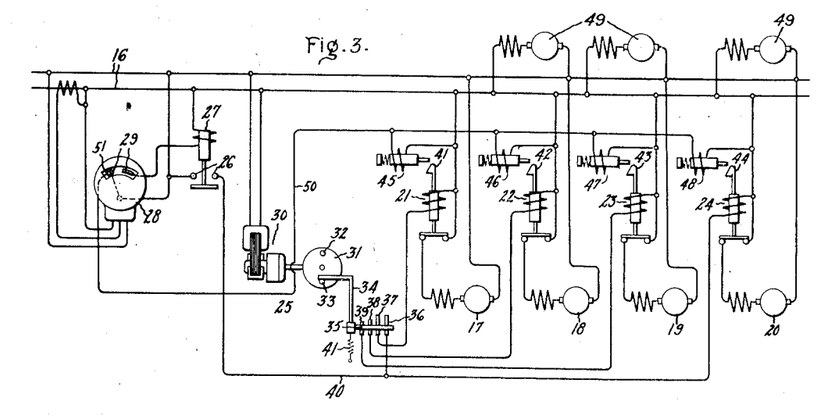
Fig. 3 is a simplified diagrammatic showing of an embodiment of my invention which operates according to Fig. 1.

Fig. 3, which is a simplified, diagrammatic showing of an embodiment of my invention which operates in accordance with Fig. 1, consists of an electric power circuit 16 to which are connected a plurality of load increments 17, 18, 19 and 20, which are shown, by way of example, as electric motors. These load increments are provided with control switches, or contactors 21, 22, 23 and 24, respectively, for controlling the connection and disconnection of their respective increments to and from the power circuit 16. These contactors are energized through a time controlled circuit controller 25 and through the contacts 26 of an auxiliary relay 27, which is controlled by an energy responsive circuit controller, such for example, as a contact making demand meter 28 connected to circuit 16 in the conventional manner. Meter 28 is provided with contacts 29 which are set so as to close when a predetermined fraction of the maximum demand allowable on circuit 16, as expressed in kilowatt hours, has been reached, and these contacts are periodically reset to their initial position, in a well known manner, at the end of each successive demand period. Contacts 29 of meter 28 are connected in circuit with the operating winding of relay 27 across any suitable source of current supply, such for example as the circuit 16, so that when contacts 29 close relay 27 picks up thereby closing its contacts 26.

The time controlled circuit controller 25 may be of any well known type and as illustrated it comprises a small synchronous motor 30 connected to be energized from circuit 16 and arranged to rotate a member 31 provided with oppositely spaced pins 32 and 33 which cooperate with a vertically movable member 34 carrying a contact arm 35. Cooperating with arm 35 are a series of stationary contacts 36, 37, 38 and 39. Contact 36 is connected to a conductor 40 which is connected across the circuit 16 and which includes the contacts 26 and the operating winding of the contactor 24. Contact 37, which is substantially of the same length as contact 36, is connected to contactor 21, while contacts 38 and 39, which are successively shorter, are connected respectively to contactors 22 and 23. The operation of the circuit controller 25 is such that as the motor 30 operates, the member 31 rotates in a counter-clockwise direction, as viewed in the drawing, whereby the pin 33 moves the member 34 upwardly so that contact arm 35 successively disengages contacts 39, 38, and 37. Upon slightly more than a half revolution of member 31 the pin 33 will move out from under the member 34 and this member will be restored to the position shown in the drawing by means of a spring 41, whereupon it will engage pin 32 and the above cycle will be repeated.

The restoring mechanism of meter 28 and the motor 30 of the timing means 25, are synchronized so that the contacts 29 and the contact arm 35 are in the position shown in the drawing at the beginning of each successive demand period.

Although I have shown power supply circuit 16 as energizing four load increments 17, 18, 19 and 20, respectively, it should be understood that as many load increments as desired may be supplied from this circuit and also additional uncontrolled loads 49 may be supplied from this circuit if desired.

The operation of Fig. 3 is as follows: Assuming that circuit 16 is energized by any suitable source of alternating current (not shown) the meter 28 will start registering the amount of energy taken by the load increments and the motor 30 of the timer 25 will operate, thereby raising the contact arm 35. If the total connected load to circuit 16 is so high that the contacts 29 close within time $T_1$ (see Fig. 1) contact arm 35 will not have left contact 39 and consequently when the contacts 29 of meter 28 close relay 27 is energized thereby causing the contacts 26 of this relay to complete the circuits for all four of the contactors 21, 22, 23 and 24, through contacts 37, 38, 39, and conductor 40 directly, respectively. As a result, all four load increments 17, 18, 19 and 20 will be disconnected from the power circuit thereby reducing the load thereon. At time $T_1$ (Fig. 1) contact 35 leaves contact 39 so that if the contacts 29 of relay 28 close between times $T_1$ and $T_2$ only load increments 17, 18 and 20 will be removed and load increment 19 will remain connected to the circuit. At time $T_2$ contact 35 leaves contact 38 so that between time $T_2$ and time $T_3$ only load increments 17 and 20 can be removed from the circuit. At time $T_3$ contact 35 leaves contact 37 so that thereafter the closure of contacts 29 of the meter cause the disconnection of load increment 20 only, and load increments 17, 18 and 19 remain connected to the circuit. It will thus be seen that the number of load increments, or the amount of load, removed from the circuit varies substantially in proportion to the rate at which the integrated energy demand on circuit 16 is building up. Stated differently, the amount of load removed varies inversely with the time required for contacts 29 of demand meter 28 to close.

At the end of the demand period the contacts of the time controlled relay 25 and of meter 28 are reset to the positions shown in the drawings and the system of Fig. 3 is ready to go through another cycle of operation, except that the relays 21, 22, 23 and 24 have to be reset to their closed positions. For providing this operation each of the relays 21, 22, 23 and 24 is provided with latch mechanisms 41, 42, 43 and 44, respectively, which are operated by electro-magnets 45, 46, 47 and 48, respectively. These electro-magnets are connected in parallel with each other in a control circuit 50 which is connected across the electric power circuit 16 through a set of back contacts 51 on meter 28. These back contacts 51 are arranged to close when the meter is reset at the end of each demand period. Consequently, when this takes place all the electro-magnets 45, 46, 47 and 48 are energized simultaneously thereby releasing the latches 41, 42, 43 and 44 and allowing the contactors 21, 22, 23 and 24 to be reset to their closed position as shown in the drawing.

Figure 4:
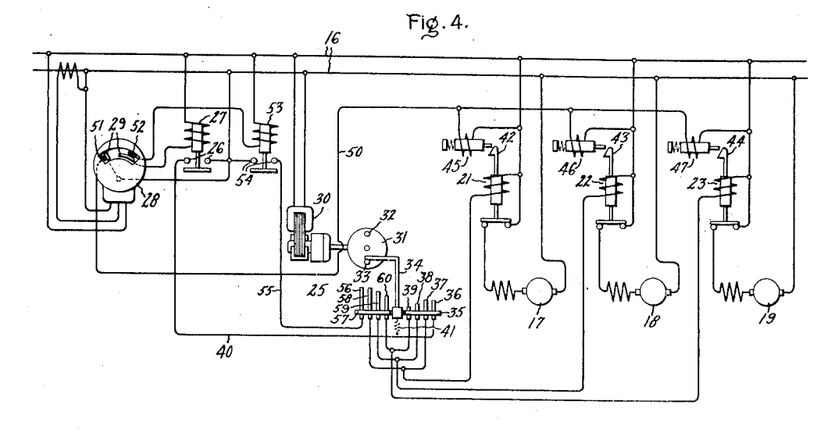
Fig. 4 is a simplified diagrammatic showing of a modification of my invention which operates according to Fig. 2.

Fig. 4 differs from Fig. 3 in that the load increment 20, which is not under time control, has been omitted, and auxiliary control means have been added for the three load increments 17, 18 and 19. This auxiliary control means comprises an extra contact 52 on the meter 28 which contact is adapted to cooperate with the movable one of contacts 29 and which is adapted to be engaged thereby at a higher value of energy consumption than is required for the closing of the original contacts 29. Consequently, the meter is provided with two sets of contacts which close respectively, at relatively low and relatively high values of energy consumption. The circuit controlled by contact 52 and the movable one of contacts 29 has in it the operating winding of a relay 53 having a set of contacts 54 which are in a circuit 55 which connects to the contact 56 on time controlled circuit controller 25. Cooperating with contact 56 is a movable arm 57 (corresponding to arm 35) on the time delay circuit controller and this arm 57 cooperates not only with contact 56 but with progressively shorter contacts 58, 59 and 60 connected respectively in parallel with contacts 37, 38 and 39.

The operation of Fig. 4 is such that if contacts 29 close before the time controlled circuit controller has moved arm 35 out of engagement with the arms 37, 38 and 39, one or more of the load increments 17, 18 and 19 will be removed from the circuit as has previously been described in connection with Fig. 3. However, if contacts 29 do not close until after contact arm 35 has left contact 37 none of the load increments will be removed at this time, but if the movable one of contacts 29 engages contact 52 before contact 57 has left contact 60 all three of the load increments 17, 18 and 19 will be removed by the energization of relays 21, 22 and 23 through the contacts 58, 59, 60, respectively. Similarly, if contact 52 is not engaged until after contact 57 has left contact 60 but before it has left contacts 58 and 59 then only load increments 18 and 19 will be removed, whereas if contact 52 is engaged after contact 57 leaves contact 59 but before it leaves contact 58, only load increment 19 will be removed.

At the end of the demand period the meter 28 is reset thereby closing contact 51 and causing the electro-magnetic tripping means to restore the relays 21, 22 and 23 to their closed position, as has been described more in detail in connection with Fig. 3.

Referring to Figs. 4 and 2 together, the time from the beginning of the demand period that is required for contact 35 to leave contact 37 corresponds to time $T_1$, the time for 35 to leave 38 corresponds to time $T_2$ and the time for 35 to leave 39 corresponds to time $T_3$, whereas the time required for 57 to leave 60 is $T_4$, for 57 to leave 59 is $T_5$ and for 57 to leave 58 is $T_6$.

Figure 5:
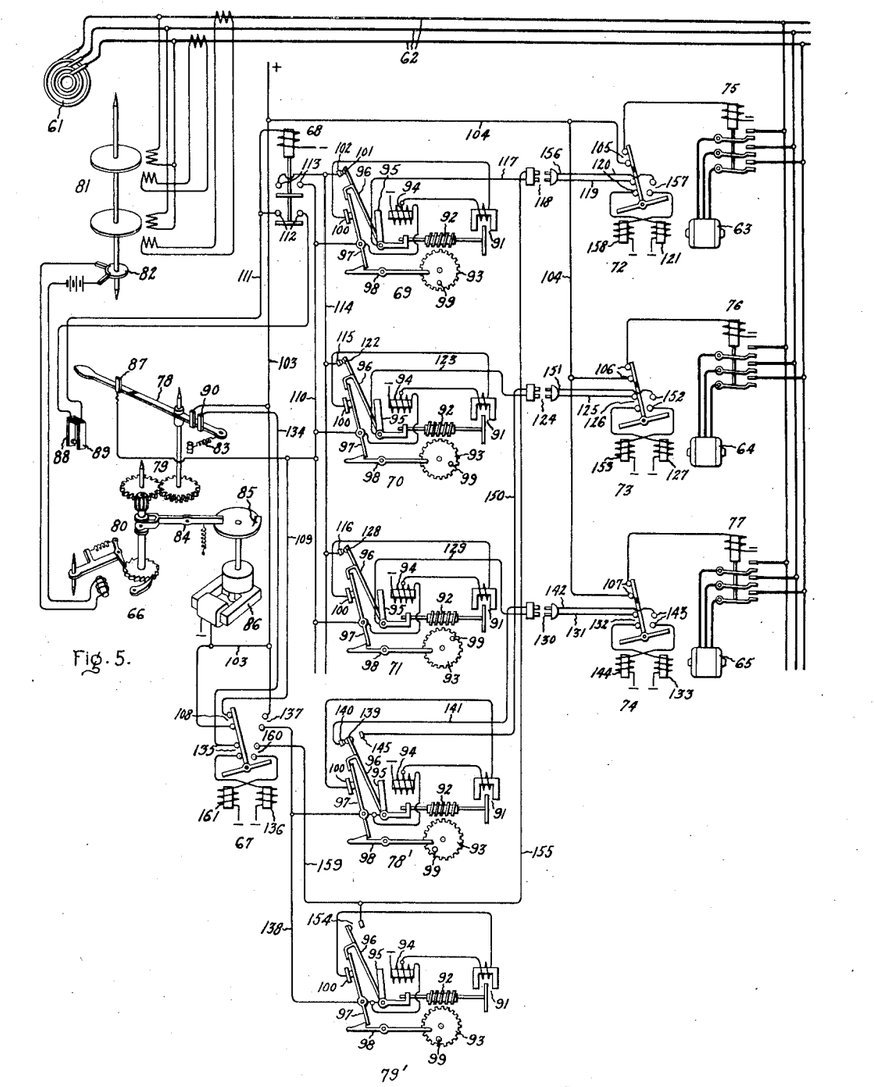
Fig. 5 is a diagrammatic view of a commercially more practical system than the system illustrated in Fig. 3.

Fig. 5 shows a polyphase system comprising a generator 61 for energizing an electric power circuit 62 to which is connected a variable load including load increments in the form of motors 63, 64 and 65. For limiting the maximum demand on circuit 62 in the way illustrated in Fig. 1, there is provided an automatic system comprising a contact making demand meter 66 which, through a master two-position relay 67 and an auxiliary relay 68, controls three time delay relays 69, 70 and 71, which in turn control respectively, the actuation of three two-position relays 72, 73 and 74 to positions whereby they cause individual contactors 75, 76 and 77 to disconnect respectively the load increments 63, 64 and 65 from the main circuit 62. In addition, the contact making meter 66 operates through the master two-position relay 67 to control two additional time delay relays 78' and 79' which, in turn, act to restore the two-position relays 72, 73 and 74 to their original positions, thereby causing the contactors 75, 76 and 77 to reconnect the load increments 63, 64, 65, respectively, to the power circuit 62.

This completes, in a general way, the description of the main elements of the system of Fig. 5 and its operation. The following is a more detailed description of the various elements of the system and its operation.

The contact making demand meter 66 comprises essentially a pivotally mounted arm, or pointer, 78, which is driven through suitable driving mechanism, such as a gear train 79, by means of an electro-magnetically operated ratchet drive 80 from a watthour meter 81 connected to respond to the energy flow in circuit 62 in the conventional manner. Meter 81 is provided with a commutator arrangement 82 for producing intermittent impulses whereby the ratchet drive 80 is actuated periodically at a rate of speed proportional to the speed of the meter and consequently proportional to the power flow, or rate of energy consumption, in circuit 62. The arrangement is such that arm 78 is rotated in a counter-clockwise direction, as viewed in the drawing, and its angular displacement is proportional to the integrated energy flow in circuit 62. A spring 83 serves to bias the arm 78 in a clockwise direction and this arm is periodically reset to a starting position by any suitable means, such as by a clutching arrangement consisting of a pivoted arm 84 which engages one of the gears of the gear train 79 which is slidably mounted so as to be capable of unmeshing with its cooperating gear. The arm 84 is in turn actuated periodically by a cam 85 which is driven by any suitable timing means, such as by a timing motor 86, which may, for example, be a small synchronous motor of the electric clock variety. With the above described arrangement, the arm 78 starts from a predetermined starting position and moves counter-clockwise for a predetermined time, whereupon the cam 85 actuates the arm 84, thereby declutching the drive of the arm 78 and allowing the spring 83 to restore it to its original starting position. Arm 78 carries a contact member 87 which is adapted to engage a fixed contact 88, which is resiliently mounted and which in turn is adapted to engage another fixed contact 89 when contact 88 is flexed enough. Contact making meter 66 is also provided with a set of back contacts 90 which are closed momentarily whenever the arm 78 is reset to its starting position. The fixed contacts 88 and 89 are so positioned that contact 87 engages contact 88 at a value of integrated energy consumption in circuit 62 which is a predetermined fraction of the maximum allowable power demand on this circuit, and which may correspond to the meter contact setting of Fig. 1.

The two-position relays 67, 72, 73 and 74 are preferably simple standard relays of conventional design and in order to avoid needless repetition the identification of their various contacts and operating windings is deferred until a detailed description of the operation and circuits is made. Similarly, auxiliary relay 68 and contactors 75, 76 and 77 are simple conventional elements so that in order to avoid unnecessary repetition only the details of these devices which enter into the operation of the system will be described and this description will be deferred until the description of the operation of the system.

The time delay relays 69, 70, 71, 78' and 79' are also conventional elements of well known construction and as these relays are all similar in construction, only relay 69 will be described in detail and the corresponding elements of the remaining relays will be given corresponding reference characters. Relay 69 comprises essentially a small motor 91 whose rotatable element carries a worm gear 92 which is adapted to be put into engagement with a gear wheel 93 upon the energization of an electromagnet 94 which attracts a suitably mounted armature 95. Connected to armature 95 is a spring member 96 which is hooked over a pivoted member 97 which is latched in the position shown by pivoted latch member 98. Gear 93 carries a pin 99 for cooperation with the latch member 98 whereby when gear 93 is turned clockwise through a given angle the pin 99 will engage the pivoted latch 98 thereby releasing the arm 97. Cooperating with pivoted arm 97 is a fixed contact 100 which is connected to motor 91 and thence to one side of a suitable source of control current which is marked with a negative polarity symbol, for convenience. Magnet 94 is connected directly to the pivoted arm 97 and thence to the negative side of the supply source as shown.

Relay 69 operates as follows: If the pivoted arm 97 is connected to the other side of the source of current supply, motor 91 will be energized through contacts 100 and magnet 94 will be energized directly by the connection mentioned. Consequently, motor 91 will start to operate and armature 95 will be attracted to magnet 94, thereby causing gears 92 and 93 to engage and cause the gear 93 to rotate in a clockwise direction thereby moving pin 99 towards the right-hand end of pivoted latch member 98. After a predetermined time pin 99 will engage the latch member, thereby causing it to release member 97 which in the meantime is being biased to a position away from contact 100 by means of the flexing of spring member 96 caused by the attraction of armature 95 to the magnet 94. As soon as arm 97 is released the circuit of the motor 91 is broken and consequently the motor comes to rest. If now the arm 97 is disconnected from the source of supply current the magnet 94 will be deenergized and armature 95 will return to the position shown in the drawing either through gravity or by means of a suitable biasing spring. This causes gear 92 to disengage gear 93 and gear 93 will be restored to its initial position, by a small coil spring (not shown).

The main control contacts of relay 69 comprise a movable contact 101, mounted on the spring member 96, and a cooperating fixed contact 102. In accordance with the above described operation of relay 69, the contacts 101 and 102 will separate a predetermined time after the energization of the relay 69.

Relays 70 and 71 differ from relay 69 only in that the pins 99 are set progressively farther and farther back so that when relays 69, 70 and 71 are simultaneously energized relay 69 operates first, then relay 70 operates and then relay 71 operates. Similarly, relays 78' and 79' have their pins 99 adjusted so that these relays operate in a relatively much shorter time than either of the relays 69, 70 and 71, but the pins of relays 78' and 79' are also so set that relay 78' operates slightly before relay 79'. The time settings of relays 69, 70 and 71 correspond to the times $T_1$, $T_2$ and $T_3$ of Fig. 1. The purpose of relays 78' and 79' is to provide automatic sequential restoration of the load increments 63, 64 and 65 to the power circuit. This sequential restoration is for the purpose of preventing momentary overloads on the circuit which might occur if all the load increments were simultaneously reconnected to the circuit. One other difference between relays 78' and 79' and the relays 69, 70 and 71 is that the two first mentioned relays have a direct connection between the arm 97 and the resilient arm 96. This is in order to insure that arms 96 of relays 78' and 79' will be energized upon the actuation of these two relays. The purpose for this will be explained more in detail in connection with the operation of the system.

The operation of the entire system as a whole, together with a detailed tracing of the essential circuits of the system, is as follows: Assume that generator 61 is being driven by any suitable prime mover (not shown) and that a suitable source of control current is applied between the points in the control circuit which are marked with a plus and minus polarity symbol. These symbols are provided merely for convenience in tracing the circuits and in actual practice it is preferable to use an alternating current source of control current so as to provide better synchronization of the various motors of the relays and demand meter. Under the above described conditions, contactors 75, 76 and 77 will be energized from the positive side of the source of control current through a conductor 104 and closed contacts 105, 106 and 107, respectively, on two-position relays 72, 73 and 74. Consequently, the contactors 75, 76 and 77 will be closed thereby connecting motors 63, 64 and 65 to the power circuit 62 and causing a load current to flow through the circuit. This load current will cause watthour meter 81 to rotate thereby causing the commutator 82 to produce control impulses in the electro-magnet ratcheting mechanism 80, whereby the demand meter pointer 78 is driven in a counter-clockwise direction. At the same time, a circuit is completed from the positive side of the control source through a conductor 103, to motor 86, whereby this motor is energized and cam 85 is driven in the proper direction so that at the end of the demand interval, it will engage arm 84 and cause resetting of the arm 78, as previously described. Also at the same time, there is a circuit completed from conductor 103 through a set of contacts 108 on master two position relay 67, thence through conductors 109 and 110 to the arms 97 of time delay relays 69, 70 and 71. Consequently, these three time-delay relays will be simultaneously energized and will start their timing operations in the manner which has already been described in detail above.

Assume now that the total load on circuit 62 is high enough so that the arm 78 of contact making demand meter 66 moves counter-clockwise far enough so that contact 87 engages contact 88. No circuit is completed when this happens and contact 87 continues moving in a counter-clockwise direction thereby flexing contact 88 until it engages contact 89. Thereupon a circuit is completed from the positive side of the control source through conductor 103, contacts 108, conductor 109, contacts 87, 88 and 89, a conductor 111, through the operating winding of relay 68 to the negative side of the control source. This causes actuation of relay 68 whereby a set of holding contacts 112 thereon are closed. These contacts are connected across contacts 88 and 89 of the meter so that should contacts 88 and 89 become disengaged the energizing circuit of relay 68 is completed through the engagement of contacts 87 and 88 and thence through the contacts 112. The purpose of this arrangement is to prevent a chattering operation of relay 68 which could otherwise take place if it were energized directly by the engagement of contacts 87 and 88 due either to vibration of the contact of meter 66 or to the fact that contact 87 has an intermittent motion due to the ratchet and pawl type of drive employed for moving it. However, with the arrangement shown, as soon as contact 88 engages contact 89 the relay 68 is energized and it will remain energized even though contacts 88 and 89 are thereafter intermittently engaged. This feature is, in and of itself, old in the art and forms no part of the present invention except insofar as it improves the operation of the system as a whole due to its presence.

The actuation of relay 68 also closes another set of contacts 113 thereon and the closure of these contacts serves to connect the positive side of the direct current control source, the connection of which to conductor 110 has already been traced, to a conductor 114 to which is connected the contact 102 of relay 69, a contact 115 of relay 70 and a contact 116 of relay 71.

Assume now that relay 68 has been actuated before any of the time delay relays 69, 70 and 71 complete their time cycle. The result is that control current flows from the positive side of the control source through conductor 114 in a manner which has already been traced, thence first through contacts 102, 101, through member 96 to a conductor 117, a plug and socket quick-detachable connection 118, a conductor 119, a set of contacts 120 on relay 72, and an operating winding 121 on this relay. Energization of operating winding 121 causes relay 72 to assume the opposite position, to that shown in the drawing, whereby contacts 105 are opened, thereby deenergizing contactor 75 and disconnecting motor 63 from power circuit 62. At the same time current flows from conductor 114 through contact 115 on relay 70, and movable contact 122 thereon, through the arm 96, thence through a conductor 123, a plug and socket connection 124, a conductor 125, contacts 126 on relay 73 and an operating winding 127 thereon. This causes relay 73 to be actuated thereby breaking its contacts 106, thereby disconnecting contactor 76 and causing motor 64 to be disconnected from the main power circuit. At the same time current flows from conductor 114 to a contact 116 on relay 71, a movable contact 128 thereon, thence through the arm 96, a conductor 129, a plug and socket connection 130, a conductor 131, contacts 132 of relay 74, and an operating winding 133 thereon. This causes relay 74 to break its contacts 107 thereby deenergizing relay 77 whereby motor 65 is disconnected from the main power circuit 62.

It will, of course, be obvious from the above description that if contacts 88 and 89 of the contact making demand meter are not closed until after relay 69 has gone through its cycle, that is to say after time T₁ but before relays 70 and 71 have been actuated, only motors 64 and 65 will be removed, whereas if both relays 69 and 70 have gone through their cycle of operation before contacts 88 and 89 are engaged but before time delay relay 71 has completed its cycle, only motor 65 will be removed from the power circuit. After all three relays have gone through their time cycle the engagement of contacts 88 and 89 merely causes the operation of relay 68 but as the main contacts of the time delay relays 69, 70 and 71 are open no load control or removal takes place.

At the end of the demand period cam 85 engages the arm 84 thereby causing disengagement of the gears 79 of the driving train for the arm 78 and allowing spring 83 to restore arm 78 to its starting position. This causes the arm 78 to bridge the back contacts 90 and of course also causes disengagement between the three contacts 87, 88 and 89. This disengagement causes a deenergization of the relay 68. The bridging of the back contacts 90 completes the circuit from the positive side of the control source through conductor 103, contacts 90, a conductor 134, a set of contacts 135 on master two position relay 67 and an operating winding 136 thereon. Energization of this winding causes this relay to snap over to its other position thereby breaking the connection between contacts 108 and completing the connection between a set of contacts 137. The breaking of the connection between contacts 108 deenergizes the magnets 94 of the relays 69, 70 and 71, thereby causing these relays to be restored to the positions shown in the drawing. The closing of the contacts 137 on relay 67 completes a circuit from the positive side of the control source through conductor 103, the contacts 137 and a conductor 138 to the time delay relays 78' and 79'. Consequently these relays start their timing cycle immediately. At the same time, a parallel circuit is completed from a contact 139 on relay 78', to a contact 140 thereon which is in engagement with contact 139, thence through a conductor 141, through the plug and socket connection 130, a conductor 142 and through a set of contacts 143 on relay 74 to an operating winding 144 on this relay, it being remembered that this relay is now in the opposite position from that shown in the drawing, so that the contacts 143 are closed. Consequently, relay 74 is immediately snapped back to the position shown in the drawing thereby bridging contacts 107 thereon, whereby the energizing circuit for relay 77 is completed, thereby reconnecting motor 65 to the power circuit. In a relatively short time relay 78' goes through its cycle and contact 139 leaves the contact 140 and engages a stationary contact 145 on this relay. This completes a circuit from contact 145 through a conductor 150, plug and socket connection 124, a conductor 151, contacts 152 on relay 73 and an operating winding 153 thereon. Energization of coil 153 snaps the relay 73 back to the position shown in the drawing thereby bridging contact 106 thereon and causing reenergization of contactor 76 and consequent reconnection of motor 64 to the power circuit. In a short time after the operation of relay 78', relay 79' completes its cycle, whereby a set of contacts 154 thereon are closed. This completes two parallel circuits. One circuit is through a conductor 155, plug and socket connection 118, a conductor 156, contacts 157 on relay 72 and an operating winding 158 thereon. The energization of winding 158 causes the two position relay 72 to snap to the position shown in the drawing, thereby bridging its contacts 105 and causing the reenergization of the contactor 75 and a consequent reconnection of the motor 63 to the main power circuit 62. The other parallel circuit controlled by contacts 154 is through a conductor 159, a set of contacts 160 on master two position relay 67 and an operating winding 161 thereon. Energization of winding 161 causes the relay 67 to be snapped back to the position shown in the drawings, in which position it will remain for the rest of the demand period due to the fact that during the operation of the relays 78 and 79 the contact arm 78 of the contact making demand meter 66 has left the contacts 90 so that these contacts are no longer bridged and a circuit will not be completed through the contact 135 and the winding 136 of relay 67 when it snaps back to the position shown in the drawings.

From the above description it will be seen that when all three motors 63, 64 and 65 are disconnected from the circuit they are disconnected in that order, but that they are restored in the order 65, 64 and 63. That is to say, they are restored in reverse order from the order in which they are disconnected. However, they may either be made to be restored in the same order in which they are disconnected by simply reversing the connections of the conductors 141 and 155 to the plug and socket connections 130 and 118, respectively. Furthermore, by interchanging the plug and socket connections, which connections are purposely made interchangeable, it is possible to make any one of the three motors the first one to be removed and the last one to be restored, or vice versa. Similarly, any one of the motors may be made the second one to be removed and the second one to be restored.

While I have shown and described particular embodiments of my invention, it will be obvious to those skilled in the art that changes and modifications may be made without departing from my invention, and I, therefore, aim to cover in the appended claims all such changes and modifications as fall within the true spirit and scope of my invention.

What I claim as new and desire to secure by Letters Patent of the United States, is:

1. In combination, an electric power circuit, a load connected thereto, and means responsive to the load on said circuit for reducing the magnitude of said load substantially in proportion to the magnitude of the average rate of increase of the integrated energy consumption of said load, said means including a time controlled element.

2. In combination, an electric power circuit, a load connected thereto, and means responsive to the load on said circuit for reducing the magnitude of said load substantially in proportion to the magnitude of the average rate of increase of integrated energy consumption of said load during the first part only of the demand period for said power circuit, said means being jointly controlled by a time controlled circuit controller.

3. In combination, an electric power circuit, a load connected thereto, a circuit controller, means responsive to a predetermined integrated energy flow in said circuit for actuating said circuit controller, control means for reducing the effective value of said load on said power circuit in response to actuation of said circuit controller, and time controlled means for varying the magnitude of the effective reduction of load substantially inversely with the time required for the actuation of said circuit controller.

4. In combination, an electric power circuit, a load connected thereto, a circuit controller, means responsive to the energy flow in said circuit for actuating said circuit controller when a predetermined integrated amount of energy has passed through said circuit, time controlled means for periodically resetting said circuit controller, control means for reducing the effective value of said load on said power circuit in response to actuation of said circuit controller, and time controlled means for varying the magnitude of the effective reduction of load substantially inversely with the time required for the actuation of said circuit controller.

5. In combination, an electric power circuit, a load connected thereto, a power demand meter connected to said circuit and having a circuit controller which is set to be actuated upon the attainment of a predetermined fraction of the maximum demand of said circuit, and means responsive to the actuation of said circuit controller for removing a fraction of the load from said circuit which fraction varies inversely in magnitude with the fraction of the demand period required for the actuation of said circuit controller, said means including time controlled circuit controlling means.

6. In combination, an electric power circuit, a plurality of load increments connected to said circuit, a contact making demand meter connected to said circuit, and having its contacts set to close upon the attainment of a predetermined fraction of the maximum demand of said circuit, means responsive to the closing of said contacts for removing a plurality of said load increments from said circuit, and time actuated circuit controlling means for varying the number of load increments removed inversely with the fraction of the demand period required for the closure of said contacts.

7. In combination, an electric power circuit, a load connected thereto, a power demand meter connected to said circuit and having a circuit controller which is set to be actuated upon the attainment of a predetermined fraction of the allowable maximum demand of said circuit, means responsive to the actuation of said circuit controller for removing part of said load from said circuit, and means for progressively reducing the amount of load so removed in accordance with increase in the time required for the actuation of said circuit controller.

8. In combination, an electric power circuit, a plurality of load increments connected thereto, a power demand meter having a circuit controller which is actuated upon the attainment of a predetermined fraction of the maximum demand of said circuit, a plurality of circuits under the control of said circuit controller for removing the respective load increments from said power circuit, and time controlled circuit controllers in said circuits for successively and cyclically incapacitating their respective circuits for removing their respective load increments from said power circuit.

9. In combination, an electric power circuit, a load connected thereto, a power demand meter connected to said circuit and having a plurality of circuit controllers which are set respectively to be actuated upon the attainment of different predetermined fractions of the maximum demand of said circuit, means responsive to the actuation of one of said circuit controllers for removing a fraction of the load from said circuit which varies substantially inversely in magnitude with the fraction of the demand period required for the actuation of said circuit controller, and means responsive to the actuation of the other circuit controller for removing a fraction of the load from said circuit which varies substantially inversely in magnitude with the fraction of the demand period required for the actuation of said other circuit controller.

10. In combination, an electric power circuit, a load connected thereto, a power demand meter connected to said circuit and having a plurality of circuit controllers which are set respectively to be actuated upon the attainment of different predetermined fractions of the maximum demand of said circuit, means responsive to the actuation of one of said circuit controllers for removing a fraction of the load from said circuit which varies substantially inversely in magnitude with the fraction of the demand period required for the actuation of said circuit controller, and means responsive to the actuation of the other circuit controller for removing a fraction of the load from said circuit which varies substantially inversely in magnitude with the fraction of the demand period required for the actuation of said other circuit controller provided said fraction of said load has not been removed in response to the actuation of the first circuit controller.

11. In combination, an electric power circuit, a plurality of load devices, individual switches for connecting and disconnecting said load devices to and from said power circuit, individual two position relays for controlling said switches, a plurality of parallel circuits for controlling respectively the operation of said relays in a manner to cause said switches to disconnect said load devices from said power circuit, individual time delayed acting relays in said circuits, said relays having different time settings, an auxiliary relay, a master two position relay, a connection for energizing said time delayed acting relays through said master two position relay when said master relay is in a given position, a connection for energizing said parallel circuits through said auxiliary relay and said master relay when the latter is in said given position, a power demand meter connected to respond to the power demand on said circuit, said meter having a pair of control contacts which are set to close when a predetermined fraction of the maximum demand of said circuit is attained, said meter also having a set of back contacts which are periodically and momentarily closed at the end of each successive demand period, a circuit completed through said control contacts and said master relay when it is in said given position for energizing said auxiliary relay, a circuit completed through said back contacts for causing said master relay to assume its other position, a plurality of other time delayed acting relays with different time settings, circuits completed through said master relay when it is in said other position for energizing said other time delayed acting relays, circuits controlled by said other time delayed acting relays for causing said two position relays to assume positions for causing said switches successively to connect said load devices to said power circuit, and a circuit controlled by the last one of said other time delayed acting relays to be actuated for energizing said master relay in such a manner as to restore it to said given position.

RICHARD H. KAUFMANN.